(12) United States Patent
Albert et al.

(10) Patent No.: US 10,295,331 B2
(45) Date of Patent: May 21, 2019

(54) DISTANCE SENSOR

(71) Applicant: SICK AG, Waldkirch (DE)

(72) Inventors: Magnus Albert, Waldkirch (DE);
Markus Hammes, Waldkirch (DE);
Jorg Sigmund, Waldkirch (DE)

(73) Assignee: SICK AG, Waldkirch (DE)

(*) Notice: Subject to any disclaimer, the term of this patent is extended or adjusted under 35 U.S.C. 154(b) by 301 days.

(21) Appl. No.: 15/222,020

(22) Filed: Jul. 28, 2016

(65) Prior Publication Data
US 2017/0030708 A1 Feb. 2, 2017

(30) Foreign Application Priority Data
Jul. 31, 2015 (DE) .................... 10 2015 112 656

(51) Int. Cl.
| | |
|---|---|
| *G01C 3/08* | (2006.01) |
| *G01B 11/14* | (2006.01) |
| *G01S 7/481* | (2006.01) |
| *G01S 17/10* | (2006.01) |
| *G01S 17/48* | (2006.01) |
| *G01S 17/87* | (2006.01) |
| *G01S 17/89* | (2006.01) |
| *G01S 7/00* | (2006.01) |

(52) U.S. Cl.
CPC .............. *G01B 11/14* (2013.01); *G01S 7/003* (2013.01); *G01S 7/4816* (2013.01); *G01S 17/10* (2013.01); *G01S 17/48* (2013.01); *G01S 17/87* (2013.01); *G01S 17/89* (2013.01)

(58) Field of Classification Search
CPC ....... G01B 11/14; G01S 7/4816; G01S 7/003; G01S 17/10; G01S 17/87; G01S 17/89; G01S 17/48
USPC .......................................................... 356/3.01
See application file for complete search history.

(56) References Cited

U.S. PATENT DOCUMENTS

| | | | | |
|---|---|---|---|---|
| 6,314,631 B1* | 11/2001 | Pryor | .................. | A01B 69/008 29/407.04 |
| 2011/0095170 A1* | 4/2011 | Erb | ....................... | G01S 17/026 250/214 R |

(Continued)

FOREIGN PATENT DOCUMENTS

| | | |
|---|---|---|
| DE | 10324628 A1 | 12/2004 |
| DE | 10 2008 063 081 A1 | 8/2010 |
| DE | 102008063081 A1 | 8/2010 |

(Continued)

OTHER PUBLICATIONS

Pancheri, et al., "CMOS Distance Sensor Based on Single Photon Avalanche Diode", DIT, Trento, Italy.

(Continued)

*Primary Examiner* — Mark Hellner
(74) *Attorney, Agent, or Firm* — Nath, Goldberg & Meyer; Jerald L. Meyer; Stanley N. Protigal

(57) ABSTRACT

A method of monitoring a hazardous zone (2) and a safe optoelectronic distance sensor (1) for monitoring a hazardous zone (2) at a movable machine part (3) having a protected zone (4), wherein the safe distance sensor (1) is arranged at the movable machine part (3), wherein a tool (5) is arranged at the movable machine part (3), wherein a plurality of distance sensors (1) are arranged in a modular manner and wherein the protected zone (4) is adapted to the tool (5).

15 Claims, 9 Drawing Sheets

(56) References Cited

U.S. PATENT DOCUMENTS

2012/0257190 A1* 10/2012 Nakanishi ............... G01S 17/06
356/51
2017/0176576 A1* 6/2017 Kotelnikov ............ G01S 17/89

FOREIGN PATENT DOCUMENTS

| DE | 202013104860 U1 | 2/2015 | | |
|---|---|---|---|---|
| DE | 20 2013 104 860 U1 | 3/2015 | | |
| DE | 202013104860 U1 | 3/2015 | | |
| DE | 202014100836 U1 | 5/2015 | | |
| DE | 10 2013 020 596 A1 | 6/2015 | | |
| DE | 102013020596 A1 | 6/2015 | | |
| EP | 2 395 274 B1 | 4/2015 | | |
| EP | 2395274 B1 | 4/2015 | | |
| JP | 2008514909 A | 5/2008 | | |
| JP | 2014501179 A | 1/2014 | | |
| WO | WO20100072193 | * 12/2009 | ............ | G01B 11/14 |

OTHER PUBLICATIONS

Office action issued in corresponding German application No. 10 2015 112 656.7 dated Apr. 12, 2016.
Niclass, Cristiano, et al "Design and Characterization of a CMOS 3-D Image Sensor Based on Single Photon Avalanche Diodes", IEEE Journal of Solid-State Circuits, vol. 40, No. 9, Sep. 2005.
German office action dated Jul. 23, 2018 for corresponding application No. 102015112656.7.

* cited by examiner

Fig.7
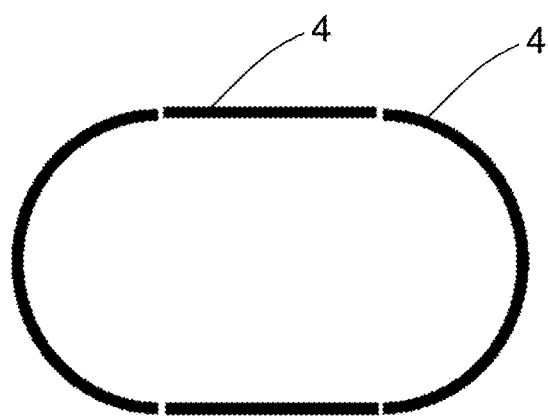
Fig.8           Fig.9           Fig.10
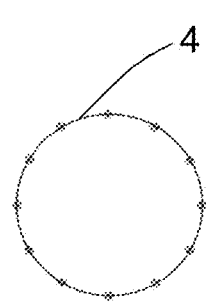 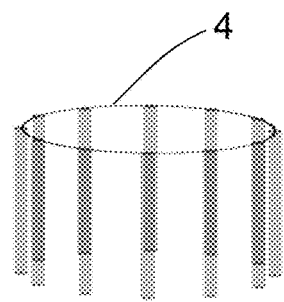 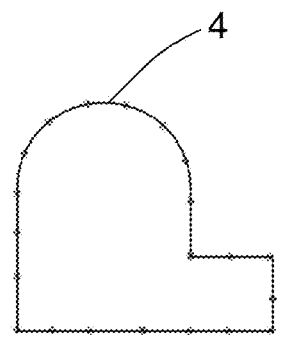

DISTANCE SENSOR

FIELD

The present invention relates to a safe optoelectronic distance sensor for monitoring a hazardous zone at a movable machine part having a protected zone and to a method of monitoring a protected field at a movable machine part having at least one safe optoelectronic distance sensor. The invention further relates to a movable machine part having a safe optoelectronic distance sensor.

BACKGROUND

Functions are resulting more and more in today's production environment in which people have to work hand in hand with robots in close spaces. Protection of a person from the robot is in this respect not possible by mechanical protective devices such as fences or barriers, but must rather be transposed into the direct environment of the robot.

To make this kind of cooperation possible in principle, robot manufacturers have developed robots having a force limitation. The maximum force a robot can exert before the movement is automatically stopped can be set here such that a force effect cannot produce serious injury in the event of a collision of the robot with a person. The motor control and the rotary encoder which carry out a positional determination of the robot arm are safety components with corresponding certification.

In addition, when designing the mechanical robot components, care is deliberately taken to provide edge-free, round or soft external contours so that a possible collision force is distributed over as large an area as possible and so that no danger of lacerations or the like can occur.

An increasing prevalence of safe small robots having safe movement controls and force-limited drives reduces the sources of danger to the tool attachment at the end of the robot arm. A problem which has not yet been solved satisfactorily in this respect is the securing of the tool at the robot per se. The tool itself frequently comprises sharp or pointed parts, parts which rotate or which are hot, etc. in order to be able to carry out its function at all. Examples include drills, screws, cutters, blades, grippers having sharp edges for filigree parts, welding guns, soldering tips, etc.

There is thus an increased risk of injury at the tool, even with a safe force limitation of the robot, due to the movement of the tool or of parts having sharp edges. This tool attachment typically has small dimensions and is well localized. At the same time, the great variety of possible tool geometries, the fast movement in a number of degrees of freedom and the demand for fast fitting and changing geometries of the tool attachment represent new demands on a securing solution which existing safety sensors cannot satisfy or can only meet unsatisfactorily.

The region around the tool cannot be secured satisfactorily using the safety sensors present today such as laser scanners or light grids since the available safety sensors are either too large or too heavy to fasten to the robot arm and are too inflexible with respect to the securing geometry.

A further problem frequently results from the radial securing of a single sensor origin such as e.g. occurs in the case of laser scanners and camera systems. In this case, dead zones arise in the view shadow of the tool which have to be covered by further sensors in a complex and/or expensive manner.

Currently available safety sensors are primarily suited for large, free monitored zones of simple geometry, for example a plane, a parallelepiped or a line and are not the correct solution for the complex geometries at a tool either with respect to their construction size or with respect to their flexibility.

Existing securing concepts additionally frequently suffer from the long response times of the safety sensors which result from the complex evaluations of the data, for example of a 3D camera, in particular of a stereoscopic 3D camera, or from a latency of the data and signal transmission. Brief distances between the protected field boundary and the hazard site are only compatible with fast reaction times of sensors and robots.

As long as the existing deficits cannot be eliminated and the hazard sites cannot be satisfactorily secured, greater restrictions result in the applications in which people and robots can work together in cooperation.

EP 2 395 274 B1, for example, discloses a plurality of time-of-flight sensors to monitor a plurality of dimensions for an operating zone. Furthermore, a plurality of time-of-flight sensors are attached to movable sections of the device. In this respect, the safety zones are set in dependence on the speed of the movable section.

SUMMARY

It is thus an object of the invention to secure a tool at a movable machine part, in particular a tool at a robot, in particular at a robot arm, in a flexible, space-saving, robust, fast-responding and inexpensive manner.

The object is satisfied by a safe optoelectronic distance sensor for monitoring a hazardous zone at a movable machine part having a protected zone, wherein the safe distance sensor is arranged at the movable machine part, wherein a tool is arranged at the movable machine part, wherein a plurality of distance sensors are arranged in a modular manner and wherein the protected zone is adapted to the tool.

The object is further satisfied by a method of monitoring a hazardous zone by means of a protected zone at a movable machine part having at least one safe optoelectronic distance sensor, wherein the safe distance sensor is arranged at the movable machine part, wherein a tool is arranged at the movable machine part, wherein a plurality of distance sensors are arranged in a modular manner and wherein the protected zone is adapted to the tool.

The invention is further achieved by a movable machine part having at least two distance sensors in accordance with the invention.

The invention comprises a local securing concept for cooperation between people and a movable machine part, in particular robots, in particular safe robots, and safe optoelectronic distance sensors.

A safe optoelectronic distance or a safe optoelectronic scanner are used for the securing. The terms optoelectronic distance sensor and light scanner are used as synonyms.

In accordance with the present invention, safety is safety in the sense of machine safety. The standard EN/IEC 61496, for example, regulates the demands on a safe sensor or on electro-sensitive protective equipment (ESPE) for securing hazardous zones. Machine safety is regulated in the standard EN 13849. The safety is, for example, ensured by a two-channel design or a design diverse in two channels of an evaluation unit for error localization and for a functional test. The safe distance sensor in accordance with the present invention is designed, for example, as intrinsically safe and recognizes internal errors. An error signal is generated, for example, on discovery of an error. The safe distance sensor furthermore optionally has a sensor testing.

In accordance with the invention, a plurality of distance sensors are arranged in a modular manner. A plurality of compact and inexpensive distance sensors are integrated in a total system and can be arranged in any desired number and in any desired directions at the movable machine part.

A high modularity is furthermore provided in accordance with the invention since the number and arrangement of the light scanners is almost as desired. A high variant generation is furthermore possible through different optical variants for different ranges and viewing angles of the distance sensors. Furthermore, different possibilities are possible for the technical safety validation of the measured values.

The protected zone is adapted, for example, to the contour or to the spatial extent of the tool. The protected zone surrounds the tool at a specific distance. The distance depends on the response time of the sensor and on the time to stop a movement of the movable machine part.

The distance sensors or the sensor system comprising the distance sensors is/are attached in a co-movable manner to the movable machine part or to the robot arm in the proximity of the hazard site, preferably directly at or above a tool mount of the robot or of the movable machine part. The protected zone is hereby at a fixed position relative to the hazard site or of the tool as a hazard site. Dead zones of the monitored zone can be avoided and the contour of the protected zone can be easily adapted to the geometry of the hazard site by the arrangement directly at the hazard site and by the use of a plurality of distance sensors or part modules which can be positioned flexibly with respect to one another.

Very good spatial resolution can be achieved by the good focusing capability. The distance sensors or the sensor system comprising the distance sensors can hereby also be easily used at points with limited space and a delineation with respect to environmental influences such as external light or multipath reflections can be achieved.

The distance sensors provide the output of measured distance values or measured spacing values. Workpieces can thereby be measured or their position and orientation can be recognized or the feed of a tool can also be monitored.

The protected zone or the protected field can be dynamically adapted in depth to the tool movement and tool geometry in order e.g. to move close enough to a workpiece. For example, on an approach to the workpiece from above, the threshold value for the triggering of the safety function can be reduced in accordance with the reducing distance.

The protected zone or protected field is optionally adapted in dependence on the instantaneous robot position. In this respect, the fact can be utilized that the robot safely knows its own position. The protected zone can in this respect be increased, decreased or only increased or decreased in a specific direction in dependence on the instantaneous position.

The distance sensors can likewise be used to monitor or secure the position of the robot itself or of individual robot joints.

A use of this modular securing concept is sensible wherever complex hazard site geometries having small dimensions have to be secured with a contour which is as exact as possible, for example to allow an approach by an operator. The securing by the fixed-position positioning of the sensors relative to the hazard site is in particular also of advantage with machines having complex movement profiles.

Due to a safe robot control and a fixed-position attachment of the distance sensors relative to the hazard site, the data of the robot position can be used without any further measures as safe input data for the safe sensor—for example for switching from protected zones or protected fields or for implementing muting or blanking functions, that is for implementing a bridging function or a masking function.

The distance sensor or light scanner has the advantage that it is of a compact design and can be accommodated in a small housing. The distance sensor is furthermore an inexpensive alternative to mechanical protection systems and ultrasound sensors. In a use or application, the distance sensor offers a high flexibility for securing various geometries or scenarios, for example non-rectangular protected fields can be realized. Furthermore, single beams can be realized for the securing. All-round securing functions can also be implemented in accordance with the invention. There is flexibility in the number of distance sensors used, from a single sensor up to systems with a number of distance sensors having a central controller, a safety controller or a control or safety control.

In a further development of the invention, reference targets are arranged in the hazardous zone.

The use of distance sensors or of the sensor system at a robot offers the possibility from a technical safety aspect of carrying out a simulated test in the form of a reference travel or reference measurement with one or more known targets or reference targets. A continuous testing of the total measurement and evaluation chain can hereby be achieved, whereby the reaching of higher safety levels is made possible. The test can be carried out cyclically and the test rate can be adapted in dependence on the demand rate.

The distance sensor or sensors can, for example, be positioned in a known position with respect to a reference target, that is, for example, with respect to a part within the hazardous zone, by an integration into a higher-ranking control and the actual measured values or distance values of the distance sensor can hereby be compared with an expectation.

DETAILED DESCRIPTION

Such a reference travel can e.g. be combined with the tool mount or with transfer travels and can hereby be integrated into the production routine in a time-saving manner. The reference targets can be attached, for example, to the robot itself, to the work surface or to other contours in the environment.

Depending on the application, the integration of the distance sensor into a higher-ranking control allows the measurement at a work surface since the respective distances are known from a control of the robot and can be compared with the actual measured values. A constant referencing can hereby be made possible, which corresponds to a closed-circuit principle and allows the achieving of higher safety levels. A response time can furthermore be considerably shortened with respect to a freely scanning, non-referenced measurement system.

In a further development, the tool is configured as changeable and the safe distance sensors are arranged at the tool or at the tool mount. The tool includes the part which is called the tool mount. The distance sensors are, for example, arranged at a tool changer of a machine.

There is the possibility for the user or customer to design a separate holder for the individual distance sensors of the sensor system and to fit the distance sensors into it and to cable them. In this respect, the user only has to watch for the axial orientation and the spacing between the distance sensors which predefines the geometrical resolution. Such a holder can be manufactured easily and individually as a milled part.

The distance sensors or the sensor system for securing remain/remains at the tool or at the tool holder and can be replaced together with the tool independently by the robot to satisfy working routines with different tools. Each tool thereby has its own safety system adapted to its specific geometry.

In a further development of the invention, the distance sensor has a highly integrated sensor module. For example, the highly integrated sensor module has a light transmitter in the form of a laser and an integrated evaluation unit for signal evaluation. The sensor module thereby has a compact design.

The highly integrated sensor modules can be manufactured using standard processes. The sensor module can thereby be manufactured inexpensively.

Highly integrated sensor modules deliver prepared and compressed data very fast and thereby allow a fast data transmission and a fast data evaluation, for example in a central evaluation unit for a plurality of distance sensors. The evaluation unit is in this respect arranged close to the distance sensors to avoid latency times by a data transmission. A distance sensor or a sensor system of distance sensors having a short and improved reaction time is/are thereby provided. The short response time allows short distances between hazard sites and the outer protected field boundary and a high process speed.

In a further development of the invention, each distance sensor has a pre-evaluation unit. The pre-evaluation unit is preferably provided to convert the sensor distance data into a specific data format and to provide them in said data format or to filter the distance data.

In accordance with a preferred embodiment, the distance sensors are connected to one another via a bus line, with safe data being able to be transmitted on the bus line.

A sensor system for securing is as a rule composed of one or more similar or different distance sensors or light scanners which are coupled to one another via a suitable bus system or via another data connection.

Every sensor module detects distance data or spacing data from its own field of vision and carries out a first data processing and data compression.

In a further preferred embodiment of the invention, safe switching signals and/or safe distance data can be transmitted on the bus line.

The evaluation unit recognizes protected field breaches and can output a safety-directed switch-off signal to stop a danger-bringing movement of the tool or to divert it in a suitable manner. This can e.g. be implemented via safe switching signals, e.g. OSSD signals (output safety switching device signals) or safe distance data, spacing data or safe spatial data of the intrusion event.

Alternatively, the evaluation unit can, however, hand over the prepared measured values or distance data to a downstream safety control via a suitable interface. The data of the sensor modules can also be provided for use in automation functions, e.g. for process control of a higher-ranking robot control or memory-programmable control, MPC in abbreviation.

Alternatively, the integration can be advanced such that a technical safety self-test and data processing takes place on the already very highly integrated sensor module and only a switch-off signal and optionally measured values is/are output. The evaluation unit has a two-channel design, for example.

The distance sensor can, however, alternatively itself have safe outputs, in particular safe semiconductor outputs. These safe outputs are of two-channel design so that redundant switching information is present. The switching signals, e.g. OSSD signals, are output via the safe outputs, e.g. OSSD (output safety switching device) outputs.

In a further development of the invention, a plurality of distance sensors have a common control and evaluation unit. The common control and evaluation unit can be formed, for example, by an FPGA (field programmable gate array) or by a processor.

A common evaluation unit, for example a microcontroller, an FPGA or an ASIC is a master of this sensor system of distance sensors.

This evaluation unit optionally also takes over the safety self-test and compensates, validates and/or optionally corrects the measured values of the individual sensors.

In a further development of the invention, the distance sensor has an optical head. The optical head allows an implementation of different protected field geometries. In addition to collimating lenses for one-dimensional monitored zones and cylinder lenses for areal protected zones, diffractively optical elements and free-form optics can also be used for any desired monitoring geometries. Dead zones can be avoided by the modular construction shape and the distributed attachment.

The optical head, distance sensor optics or reception optics is optionally integrated on a chip or in the chip housing to achieve an inexpensive and compact solution, in particular with high volumes.

An optical band pass filter can also be arranged, in particular vapor deposited, directly on the chip or on the light receiver to attenuate background light.

The light scanner or distance sensor is very compact due to a high integration and a small size of the receiver optics or distance sensor optics.

Different monitoring angles and different ranges can be realized by different reception optics or distance sensor optics.

The light path can be shaped and adapted to the geometry of the application by the use of different optical elements for the beam shaping. For example, complex protected zones such as lattices, frames or curved structures can be produced using diffractively optical elements and free-form lenses.

In a further development of the invention, the protected zone of individual distance sensors is of linear or areal form. In a further development of the invention, the protected zone of a plurality of combined distance sensors is of grid-shape or has multiple areas. In a further development of the invention, the protected zone of single distance sensors or of a plurality of distance sensors is sectionally planar and/or arched.

Combined protected zones or also protected volumes are also conceivable which are activated as required. Different tool actions can hereby be secured or a protected volume can be increased for a fast movement in one direction.

In accordance with a particularly preferred embodiment of the invention, the distance sensor is a time-of-flight sensor.

A time-of-flight sensor is, for example, based on a time-of-flight chip in accordance with the PMD process which carries out distance measurements on the basis of a phasing measurement of modulated light.

A distance sensor or light scanner in accordance with the time-of-flight principle has at least one light transmitter which transmits consecutive light pulses into a measured zone and has at least one light receiver which receives the light pulses reflected at an object in the measured zone and supplies them in the form of received electrical signals to a control and evaluation unit which determines a distance signal representative of the distance of the object from the light sensor while taking account of the speed of light from the time between transmission and reception of the light pulse.

In accordance with a preferred embodiment, a light receiver of the distance sensor has at least one array of single photon avalanche diodes.

Single photon avalanche diodes are also simply called SPADs. Other common terms are 'silicon photomultiplier' (SiPM). 'Geiger mode avalanche photo diode' or 'single photon counting diode'. Single photo avalanche diodes are photosensitive detectors which can be implemented in standard CMOS technology and which, in a similar manner to avalanche photo diodes, convert incident photons into current pulses. Unlike avalanche photo diodes, however, single photon avalanche diodes are operated over an avalanche voltage. A single incident photon thus already triggers an avalanche effect which can be detected as a current pulse. Due to the high sensitivity, namely an amplification factor of $10^6$, even the smallest received powers down to single photons can be detected.

A use of a time-of-flight sensor, in particular the use of single photon avalanche diodes in combination with pulse lasers, delivers distance information with a precision of, for example, up to approximately one millimeter. At the same time, a simple optical head allows the implementation of good spatial selectivity and a delineation with respect to interfering light via a focusing.

Different time-of-flight methods with a corresponding evaluation can be implemented for the distance measurement.

A pulse method can be provided. For example, one or more time-to-digital converters can be provided for the pulse method in which each single photon event is provided with a time stamp. With a useful signal, a plurality of time stamps therefore occur in correlation. The measured value generation takes place statistically. Background light, in contrast, generates randomly distributed time stamps.

Furthermore, a CW (continuous wave) process can be used, with a light signal being used which is modulated constantly in time. In this method, the single photon events are distributed via a gating signal into two counters and a phase is calculated from the ratio of the counts.

Furthermore, analog signals of the single photon diode array can be evaluated. They are compared with a threshold value, are sampled or are evaluated using statistical methods.

In the evaluation according to the time-of-flight process, an amplitude value can also be generated in addition to the distance value, e.g. by a histogram of the time stamps, by a count rate or by a voltage amplitude in an analog evaluation. A validation can be carried out by the amplitude value, in particular in technical safety applications.

The use of single photon avalanche diodes offers the following advantages: Single photon avalanche diodes can be manufactured in a standard CMOS process. The light scanner thus offers high integration capability, e.g. as an ASIC. The light transmitter, for example a VSCEL, a laser diode or a light emitting diode, and the control and evaluation unit or a separate light transmitter control can likewise be integrated on the chip or in the housing.

The distance sensor is less expensive than photosensitive receivers previously customary in safety technology. Very compact systems are possible by a multiple arrangement of light sensors. A high sensitivity down to single photons is given by the use of single photon avalanche diodes. An optional optics can thereby be designed in a very compact manner.

A temperature compensation of the time-of-flight or a temperature regulation of the SPAD bias or of the single photon avalanche diode bias is furthermore possible in the light scanner or in the distance sensor. The bias of the individual photon avalanche diodes is preferably regulated in a temperature dependent manner to maintain it in the working range of a Geiger mode. The logic for the regulation is preferably co-integrated. Furthermore, only voltages of less than 70 volts, for example 50 volts to 65 volts, and no high voltages are required for the operation of the single photon avalanche diode receiver of the light scanner. Furthermore, a validation is possible by an evaluation of the distance and of the signal level.

The light transmitter is in this respect optionally arranged in a first housing chamber and the light receiver in a second, adjacent housing chamber. The housing chambers are optically isolated so that there is no direct optical connection between the light transmitter and the light receiver. Only light of the light transmitter reflected or remitted at an object arrives at the light receiver.

In a further development of the invention, the light receiver of the distance sensor has at least one array comprising single photon avalanche diodes.

So that the light receiver with the at least one single photon avalanche diode is not already saturated by single photons, e.g. by external light, a number of single photon avalanche diodes are arranged and are evaluated together. In principle, the analog signals of the single photon avalanche diode pixels or of the single photon avalanche diode elements are added. It is also possible to digitize the avalanches of each single photon avalanche diode via e.g. a comparator or e.g. an analog-to-digital converter and to evaluate them digitally. However, the avalanches of each single photon avalanche diode can also be directly digitally further processed.

To cover the option of a larger angular range by the distance sensor or light scanner and nevertheless to obtain the required spatial resolution for the detection of e.g. a hand or an arm, the single photon avalanche diode array can be broken down into so-called macropixels. In this respect, a plurality of spatially adjacent single photon avalanche diode cells are associated with a common evaluation and evaluate the received light from a specific angular range via a corresponding optics. The arrangement can in this respect take place in a linear or areal manner.

The dynamics and/or an external light behavior can be scaled via the different single photon avalanche diodes or the single photon avalanche diode arrays.

In a further development the safe distance sensor is a distance sensor, wherein the distance signals or received signals are added in a histogram and are statistically evaluated.

For example, instead of a single pulse evaluation, a plurality of individual measurements are carried out with a respective transmitted pulse and the respective received signals are added in a histogram. The useful signal is added by this statistical evaluation, while random noise influences are averaged so that the signal-to-noise ratio is considerably improved. It is a special feature of the process that different measures are taken to be able to carry out this more complex evaluation on particularly inexpensive hardware. This includes only using a zero-threshold comparator which digitizes, that is binarizes, the individual signal with only 1-bit resolution, instead of using a complex, fast A/D converter. In addition, the effective sampling rate of such a statistical process is substantially increased by a plurality of measures to detect the received time and thus the time-of-flight with a greater temporal precision. The 1-bit resolution has advantages, for instance by implementation with simple components. For example, a plurality of single pulses underlie each distance measurement.

In a further development of the invention, the distance sensor is a triangulation sensor. It can be a question of laser stripe sensors in this respect, for example. In this respect, lines or line patterns or dots or dot patterns are, for example, projected into the hazard site and are evaluated using the spatially resolving receiver of the triangulation sensor. The patterns can in this respect be projected constantly or also variably in time.

The distance sensor has no mechanically movable parts such as deflection mirrors or the like.

BRIEF DESCRIPTION OF THE DRAWING

The invention will also be explained in the following with respect to further advantages and features with reference to the enclosed drawing and to embodiments. The Figures of the drawing show in:

FIG. 7: an oval protected zone;

FIG. 8: a circular protected zone;

FIG. 9: a circular protected zone;

In the following Figures, identical parts are provided with identical reference numerals.

FIG. 1 shows a safe optoelectronic distance sensor 1 for monitoring a hazardous zone 2 at a movable machine part 3 having a protected zone 4, wherein the safe distance sensor 1 is arranged at the movable machine part 3, wherein a tool 5 is arranged at the movable machine part 3, wherein a plurality of distance sensors 1 are arranged in a modular manner and wherein the protected zone 4 is adapted to the tool 5.

Figure 1:
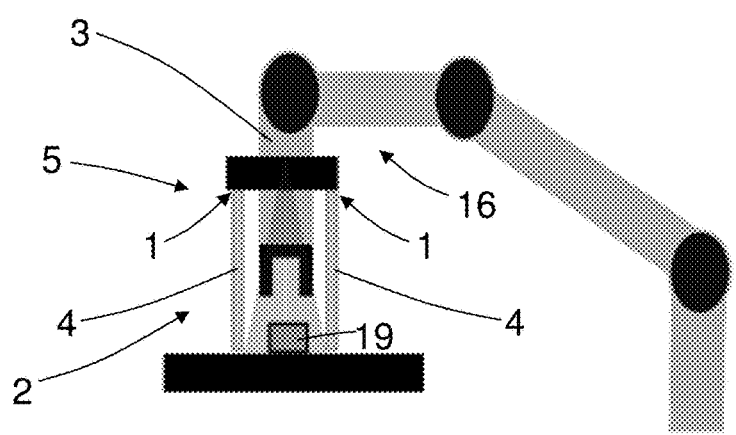
FIG. 1: at least one safe optoelectronic distance sensor at a movable machine part.

A plurality of compact and inexpensive distance sensors 1 are integrated in a total system and can be arranged in any desired number and in any desired directions at the movable machine part 3.

The protected zone 4 is adapted, for example, to the contour or to the spatial extent of the tool 5. The protected zone 4 surrounds the tool 5 at a specific distance. The distance depends on the response time of the distance sensor and 1 on the time to stop a movement of the movable machine part 3.

The distance sensors 1 or the sensor system comprising the distance sensors 1 is/are attached in a co-movable manner to the movable machine part 3 or to the robot arm 16 in the proximity of the hazard site, preferably at or above a tool mount of the robot or of the movable machine part 3. The protected zone 4 is hereby at a fixed position relative to the hazard site or of the tool 5 as a hazard site.

Figure 2:
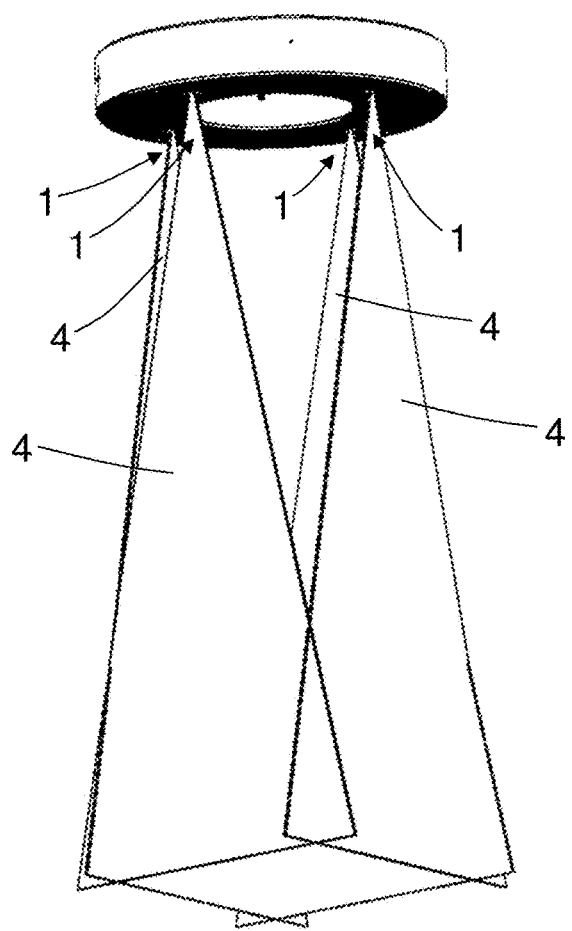
FIG. 2: a plurality of distance sensors at a tool.

In accordance with FIG. 2, a plurality of distance sensors 1, in particular four distance sensors 1, are arranged in a modular manner. The distance sensors 1 each have an areal protected zone 4. The areas of the individual protected zones 4 are in this respect arranged perpendicular with respect to one another such that a tool is surrounded by the protected zones 4.

Figure 3:
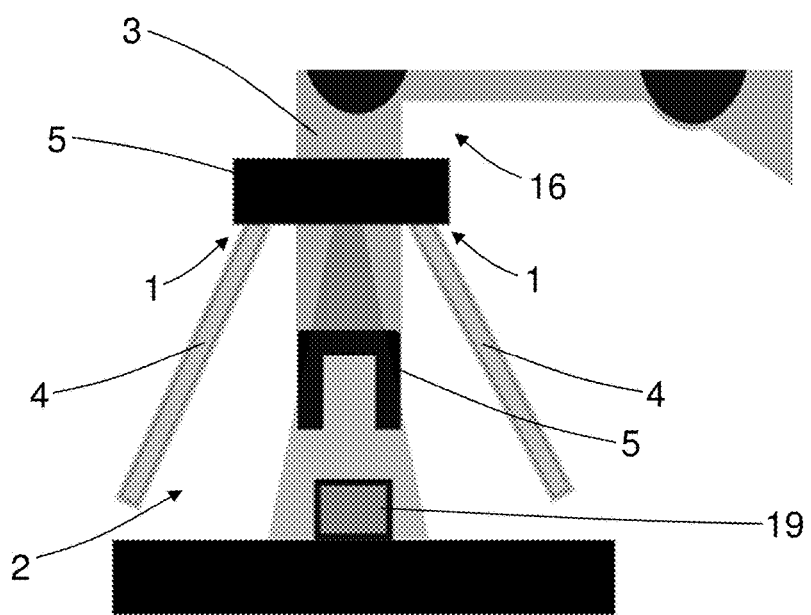
FIG. 3: at least one safe optoelectronic distance sensor at a robot arm.

FIG. 3 shows protected zones 4 which are outwardly inclined to recognize an intrusion into the hazardous zone 2 earlier.

The distance sensor or sensors 1 can, for example, be positioned in a known position with respect to a reference target, that is, for example, with respect to a part within the hazardous zone 2, by an integration into a higher-ranking control and the actual measured values or distance values of the distance sensor 1 can hereby be compared with an expectation.

The reference targets can be attached, for example, to the robot itself, to the work surface or to other contours in the environment.

The distance sensors 1 provide the output of measured distance values or measured spacing values.

In accordance with FIG. 3 and FIG. 1, the depth of the protected zone 4 can be dynamically adapted to the tool movement and to the workpiece geometry in order e.g. to approach closely enough to a workpiece 19.

In accordance with FIG. 3 and FIG. 2, the tool 5 is changeable and the safe distance sensors 1 are arranged at the tool 5.

In accordance with FIG. 3, the protected zone of individual distance sensors is linear or areal.

There is the possibility for the user or customer to design a separate holder for the individual distance sensors 1 of the sensor system and to fit the distance sensors 1 into it and to cable them. In this respect, the user only has to watch for the axial orientation and the spacing between the distance sensors 1 which predefines the geometrical resolution. Such a holder can be manufactured easily and individually as a milled part.

The distance sensors 1 or the sensor system for securing remain/remains at the tool 5 and can be replaced together with the tool 5 independently by the robot to satisfy working routines with different tools 5.

Figure 4:
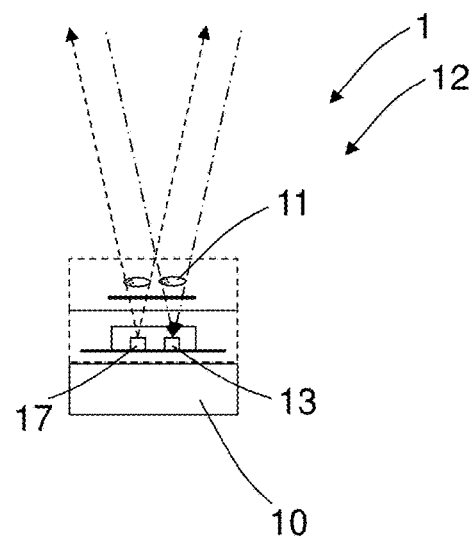
FIG. 4: a distance sensor

In accordance with FIG. 4, the distance sensor 1 is a time-of-flight sensor 12.

A distance sensor 1 in accordance with FIG. 4 or a light scanner in accordance with the time-of-flight principle has at least one light transmitter 17 which transmits consecutive light pulses into a measured zone and has at least one light receiver 13 which receives the light pulses reflected at an object in the measured zone and supplies them in the form of received electrical signals to a control and evaluation unit 10 which determines a distance signal representative of the distance of the object from the light sensor while taking account of the speed of light from the time between transmission and reception of the light pulse.

Figure 5:
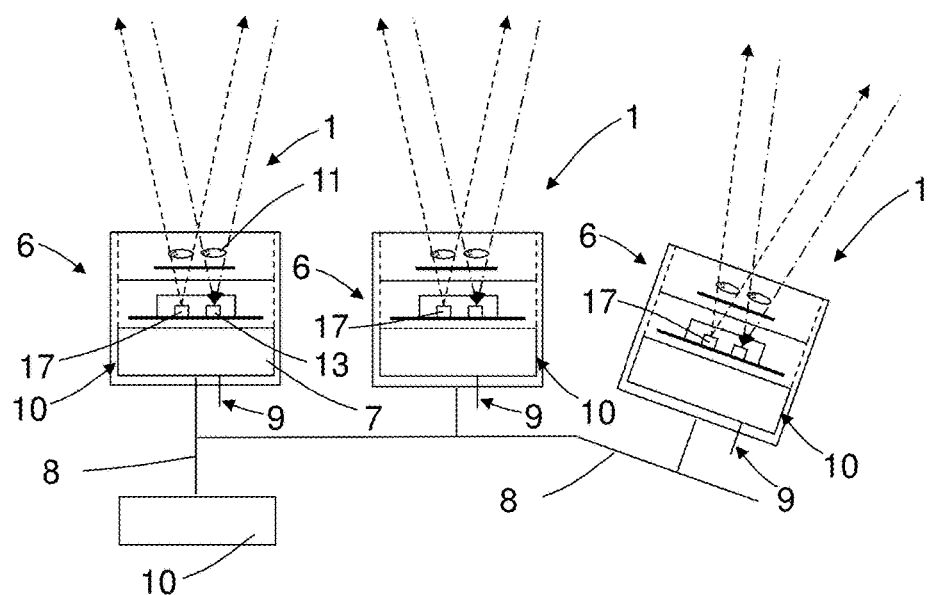
FIG. 5: a plurality of distance sensors at a bus line.

In accordance with FIG. 5, the distance sensor 1 has a highly integrated sensor module 6.

For example, the highly integrated sensor module 6 has a light transmitter 17 in the form of a laser and an integrated pre-evaluation unit 7 or evaluation unit 10 for signal evaluation.

The pre-evaluation unit 7 or evaluation unit 10 is in this respect arranged close to the distance sensors to avoid latency times by a data transmission.

In accordance with FIG. 5, each distance sensor 1 has a pre-evaluation unit 7. The pre-evaluation unit 7 is preferably provided to convert the sensor distance data into a specific data format and to provide them in said data format or to filter the distance data.

In accordance with FIG. 5, the distance sensors 1 are connected to one another via a bus line 8, with safe data being able to be transmitted on the bus line 8.

A sensor system for securing is as a rule composed of one or more similar or different distance sensors 1 or light scanners which are coupled to one another via a suitable bus system or via another data connection.

Every sensor module or every distance sensor 1 detects distance data or spacing data from its own field of vision and carries out a first data processing and data compression. Safe switching signals and/or safe distance data can be transmitted on the bus line 8.

The control and evaluation unit 10 recognizes protected field breaches and can output a safety-directed switch-off signal to stop a danger-bringing movement of the tool or to divert it in a suitable manner. This can e.g. be implemented via safe switching signals, e.g. OSSD signals (output safety switching device signals) or safe distance data, spacing data or safe spatial data of the intrusion event.

Alternatively, the control and evaluation unit 10 can, however, hand over the prepared measured values or distance data to a downstream safety control via a suitable interface. The data of the sensor modules can also be provided for use in automation functions, e.g. for process control of a higher-ranking robot control or memory-programmable control, MPC in abbreviation.

Alternatively, the integration can be advanced such that a technical safety self-test and data processing takes place on the already very highly integrated sensor module and only a switch-off signal and optionally measured values is/are output. For example, the control and evaluation unit 10 is configured with two channels.

The distance sensor 1 in accordance with FIG. 5 can, however, alternatively itself have safe outputs 9, in particular safe semiconductor outputs. These safe outputs 9 are e.g. of two-channel design so that redundant switching information is present. The switching signals, e.g. OSSD signals, are output via the safe outputs, e.g. OSSD (output safety switching device) outputs.

In accordance with FIG. 5, a plurality of distance sensors 1 can also have a common control and evaluation unit 10. A common control and evaluation unit is a master of this sensor system of distance sensors 1.

The control and evaluation unit 10 also takes over the safety self-test and compensates, validates and/or optionally corrects the measured values of the individual distance sensors 1.

In accordance with FIG. 4, each distance sensor 1 has an optical head 11. The optical head 11 allows an implementation of different protected field geometries. In addition to collimating lenses for one-dimensional monitored zones and cylinder lenses for areal protected zones, diffractively optical elements and free-form optics can also be used for any desired monitoring geometries.

Different monitoring angles and different ranges can be realized by different optical head 11 or reception optics or distance sensor optics.

In accordance with FIG. 7, the protected zone 4 has multiple areas. The protected zone 4 comprises two semi-cylindrical protected zones 4 which are connected to one another by two respective areal protected zones 4 so that a tubular protected zone 4 is formed.

In accordance with FIG. 8 and FIG. 9, the protected zone 4 of a plurality of combined distance sensors 1 is in grid shape, whereby a circular cylindrical protected zone 4 is formed.

In accordance with FIGS. 7 and 10, the protected zone 4 of individual distance sensors 1 or of a plurality of distance sensors 1 are sectionally planar and/or arched.

Figure 11:
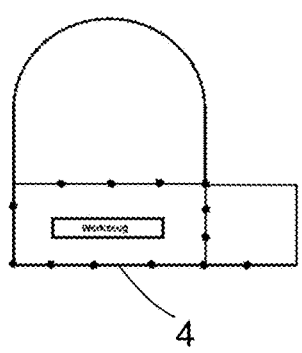
FIGS. 11 to 13: a multi-area protected zone, with different zones being activated.
Figure 12:
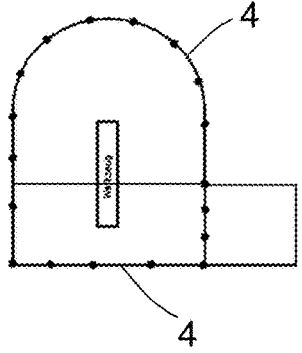
Figure 13:
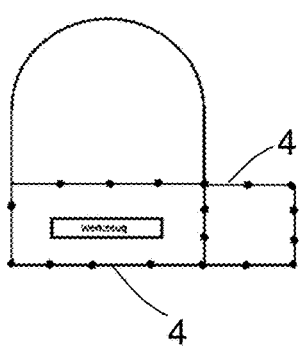

Combined protected volumes or protected zones 4 are also conceivable at a holder in accordance with FIGS. 11 to 13 and are activated as required. Different tool actions can hereby be secured or a protected volume or protected zone 4 can be increased for a fast movement in one direction. In FIGS. 11 to 13, the respective active protected zones 4 are represented by the individual active light beams which are shown as dots on the protected zone lines. The light beams in this respect extend perpendicular to the plane of the sheet. A rectangular protected zone 4 is initially activated in FIG. 11. In accordance with FIG. 12, the rectangular protected zone 4 of FIG. 11 is expanded by a semicircular protected zone 4. In accordance with FIG. 13, the rectangular protected zone 4 of FIG. 11 is expanded by a further adjacent rectangular protected zone 4.

Figure 6:
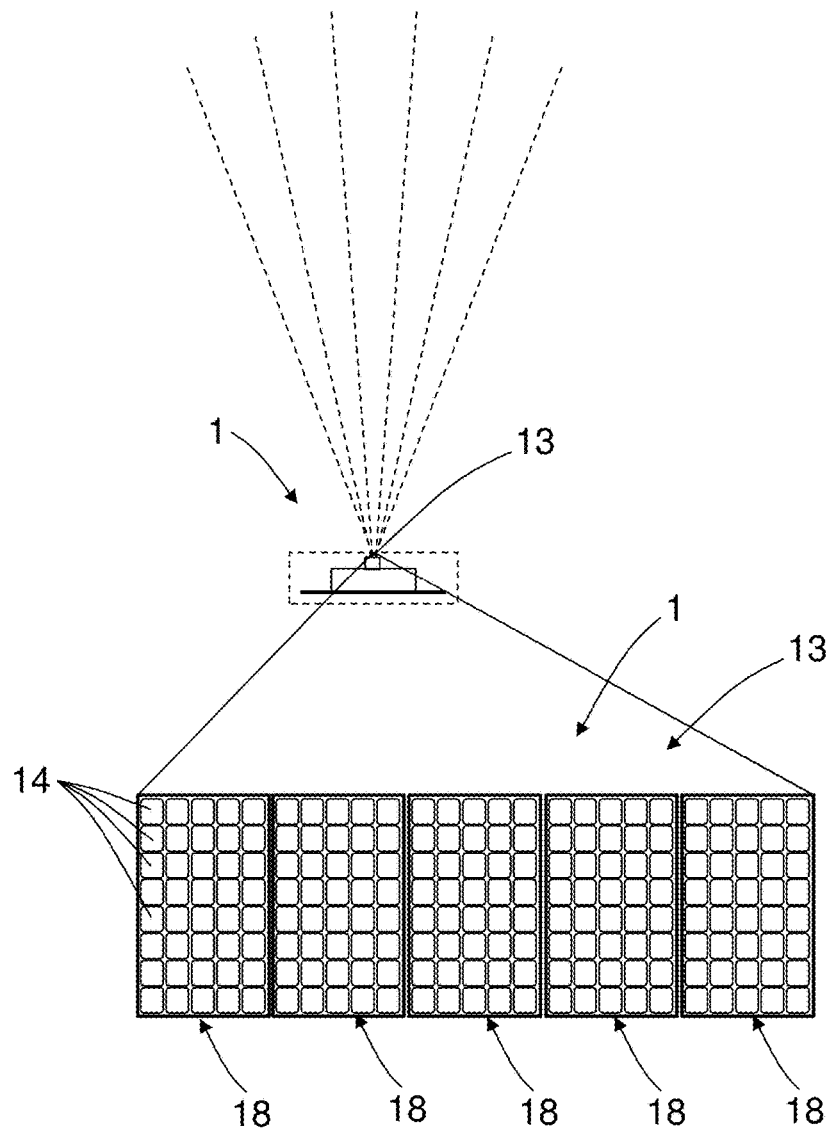
FIG. 6: a light receiver of the distance sensor with at least one array of single photon avalanche diodes.

In accordance with FIG. 6, a light receiver 13 of the distance sensor 1 has at least one array 18 of single photon avalanche diodes 14.

To cover the option of a larger angular range by the distance sensor 1 or light scanner and nevertheless to obtain the required spatial resolution for the detection of e.g. a hand or an arm, the single photon avalanche diode array 18 can be broken down into so-called macropixels. In this respect, a plurality of spatially adjacent single photon avalanche diode cells are associated with a common evaluation and evaluate the received light from a specific angular range via a corresponding optics. The arrangement can in this respect take place in a linear or areal manner.

In accordance with an embodiment, not shown, the distance sensor is a triangulation sensor. It can be a question of laser stripe sensors in this respect, for example. In this respect, for example, lines or line patterns or dots or dot patterns are projected into the hazard site and are evaluated using the spatially resolving receiver of the triangulation sensor. The patterns can in this respect be projected constantly or also variably in time.

Figure 14:
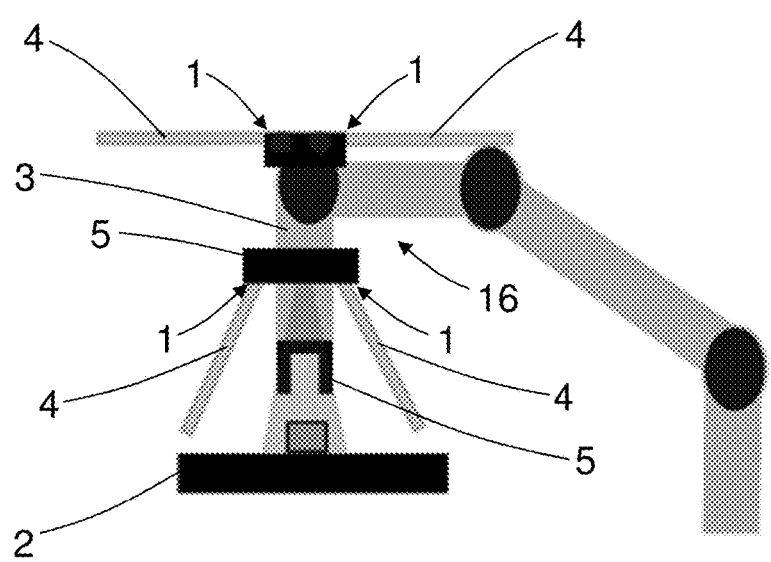
FIG. 14: at least one safe optoelectronic distance sensor at a robot arm.

FIG. 14 shows at least one safe optoelectronic distance sensor 1 at a robot arm 16. The distance sensors 1 or the protected zones 4 can also be attached to the machine or to the robot arm in other directions and at other positions.

REFERENCE NUMERALS 1 distance sensor
2 hazardous zone
3 movable machine part
4 protected region
5 tool
6 sensor module
7 pre-evaluation unit
8 bus line
9 safe outlets
10 control and evaluation unit
11 optical head
12 time-of-flight sensor
13 light receiver
14 single photon avalanche diodes
16 robot arm
17 light transmitter
18 array
19 workpiece

The invention claimed is:

1. A safe optoelectronic distance sensor for monitoring a hazardous zone at a movable machine part having a protected zone,
wherein the safe distance sensor, provided as a time-of-flight sensor, is arranged at the movable machine part, and wherein a tool is arranged at the movable machine part,
wherein a plurality of optoelectronic distance sensors are arranged in a modular manner;
and wherein the protected zone is adapted to the tool,
and wherein a light receiver of the distance sensor has at least one array of single photon avalanche diodes.

2. The sensor in accordance with claim 1, wherein reference targets are arranged in the hazardous zone.

3. The sensor in accordance with claim 1, wherein the tool is changeable and the safe distance sensors are arranged at the tool.

4. The sensor in accordance with claim 1, wherein the distance sensor has a highly integrated sensor module.

5. The sensor in accordance with claim 1, wherein each distance sensor has a pre-evaluation unit.

6. The sensor in accordance with claim 1, wherein the distance sensors are connected to one another via a bus line, with safe data being able to be transmitted on the bus line.

7. The sensor in accordance with claim 1, wherein safe switching signals and/or safe distance data can be transmitted on the bus line.

8. The sensor in accordance with claim 1, wherein a plurality of distance sensors have a common control and evaluation unit.

9. The sensor in accordance with claim 1, wherein the distance sensor has an optical head.

10. The sensor in accordance with claim 1, wherein the protected zone of individual distance sensors is linear or areal.

11. The sensor in accordance with claim 1, wherein the protected zone of a plurality of combined distance sensors is of grid shape or has multiple areas.

12. The sensor in accordance with claim 1, wherein the protected zone of individual distance sensors or of a plurality of distance sensors is sectionally planar and/or arched.

13. The sensor in accordance with claim 1, wherein the distance sensor is a triangulation sensor.

14. A movable machine part having at least two distance sensors in accordance with claim 1.

15. A method of monitoring a hazardous zone by means of a protected zone at a movable machine part having at least one safe optoelectronic distance sensor,
wherein the safe distance sensor, provided as a time-of-flight sensor, is arranged at the movable machine part, with a tool being arranged at the movable machine part,
in which a plurality of optoelectronic distance sensors are arranged in a modular manner;
and in which the protected zone is adapted to the tool,
and wherein a light receiver of the distance sensor has at least one array of single photon avalanche diodes.

* * * * *